United States Patent
Vasquez et al.

(10) Patent No.: US 8,675,827 B2
(45) Date of Patent: Mar. 18, 2014

(54) REAL-TIME ANALYTICS PAYMENT INFORMATION SCREENING

(75) Inventors: Juan Vasquez, Gibsonton, FL (US); Prashant Desai, Land O Lakes, FL (US); David A. Cathey, St. Petersburg, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 717 days.

(21) Appl. No.: 12/888,728

(22) Filed: Sep. 23, 2010

(65) Prior Publication Data

US 2012/0076279 A1    Mar. 29, 2012

(51) Int. Cl.
 *H04M 1/64* (2006.01)
(52) U.S. Cl.
 USPC ............ 379/88.01; 379/88.08; 379/88.18; 379/88.22; 704/246; 705/44

(58) Field of Classification Search
 USPC .......... 379/88.01, 88.04, 88.22, 88.08, 88.18; 704/246; 705/44
 See application file for complete search history.

(56) References Cited

U.S. PATENT DOCUMENTS

| 2002/0007278 A1* | 1/2002 | Traynor .................. 704/275 |
| 2011/0125498 A1* | 5/2011 | Pickering et al. ........... 704/246 |
| 2011/0317828 A1* | 12/2011 | Corfield ................. 379/265.02 |

* cited by examiner

*Primary Examiner* — Simon Sing

(57) ABSTRACT

A method including receiving a voice call; analyzing speech in real-time to determine whether payment information is included in the voice call; omitting to record the voice call when it is determined that the voice call includes the payment information; and recording the voice call when it is determined that the voice call does not include the payment information.

20 Claims, 12 Drawing Sheets

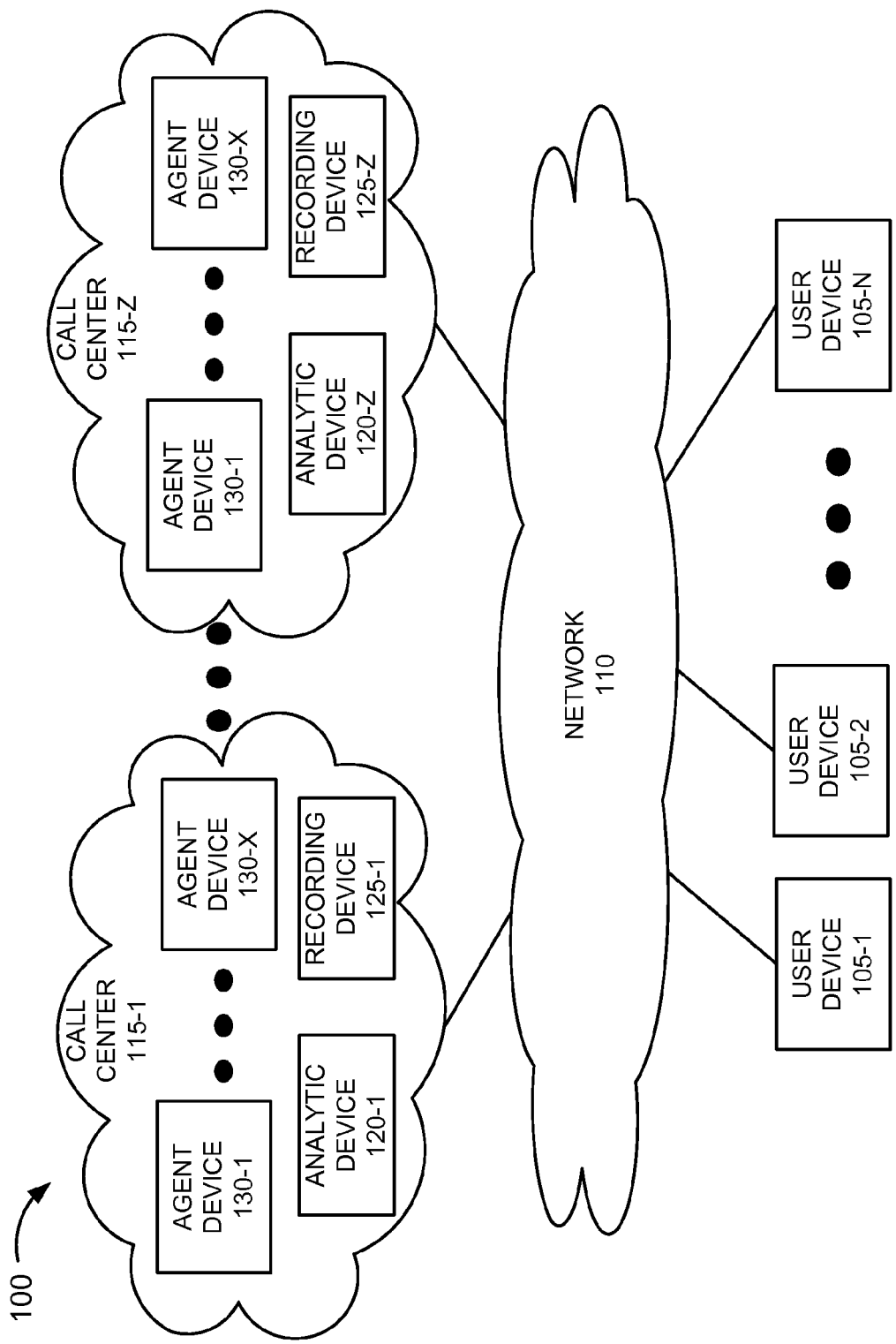

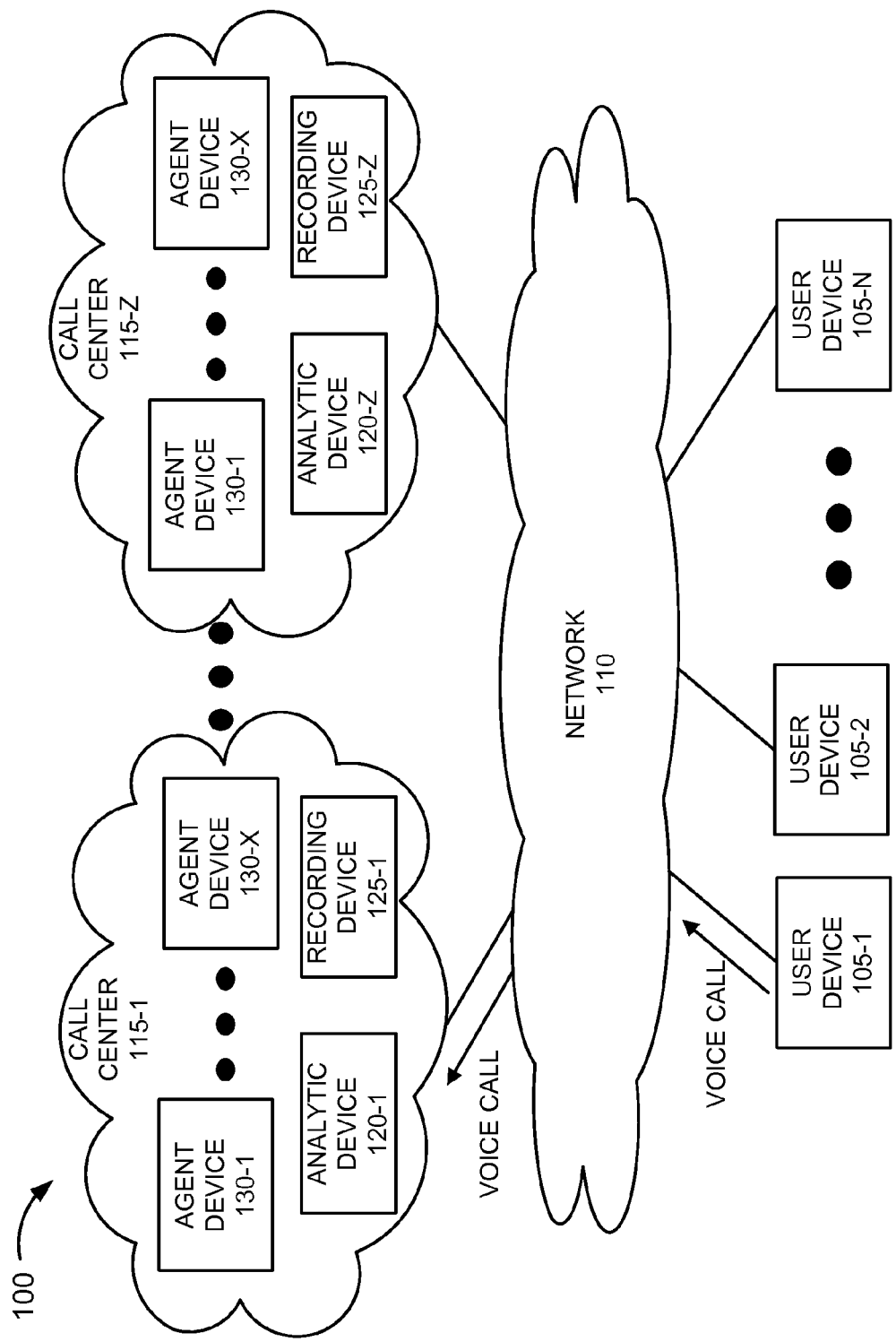

REAL-TIME ANALYTICS PAYMENT INFORMATION SCREENING

BACKGROUND

Call centers may provide customers with various services. For example, a call center may include a customer service department, a repair department, a billing/payment department, a sales department, and/or a change-in-service department. Typically, the billing/payment department may manage billing and accept payment for services or products from customers. Additionally, or alternatively, a business may have other types of centers that may receive sensitive payment information.

BRIEF DESCRIPTION OF THE DRAWINGS

FIG. 1A is a diagram illustrating an exemplary environment in which an exemplary embodiment for real-time screening of payment information may be implemented;

FIGS. 1B-1F are diagrams illustrating an exemplary process for providing real-time screening of payment information according to an exemplary embodiment;

DETAILED DESCRIPTION OF PREFERRED EMBODIMENTS

Figure 1C:
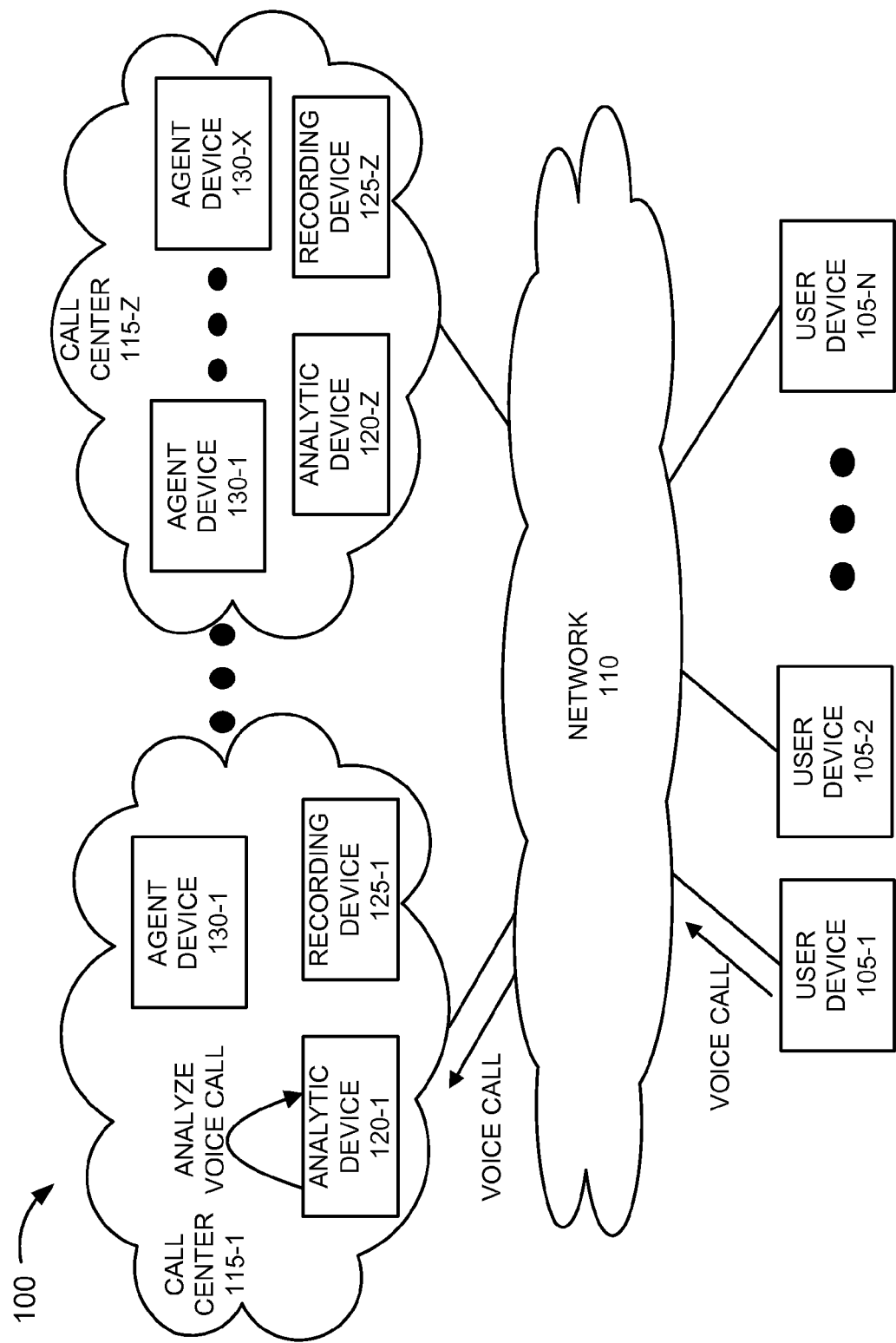

The following detailed description refers to the accompanying drawings. The same reference numbers in different drawings may identify the same or similar elements. Also, the following detailed description does not limit the invention.

The term "payment information," as used herein, is intended to be broadly interpreted to include for example, credit card codes (e.g., code verification value (CVV), CVV2 code, card validation code (CVC), card identification (CID), etc.) credit card numbers, expiration date, cardholder data (e.g., name, address, social security number (SSN), etc.), bank account numbers (e.g., checking account numbers, etc.) and/or bank routing numbers.

During a call, a customer may, for example, vocalize sensitive payment information (e.g., credit card information, etc.). Additionally, a call center may record this type of call.

In view of the above, call centers are confronted with protecting sensitive payment information. For example, the call centers may comply with the Payment Card Industry Data Security Standard (PCI DSS) and/or state law that provide(s) an information security standard to prevent credit card fraud, etc.

According to exemplary embodiments described herein, real-time screening of payment information may be provided. According to an exemplary embodiment, the real-time screening of payment information may include analyzing voice data (e.g., human speech, etc.) to determine whether the voice data includes payment information. When it is determined that the voice data includes payment information, the voice data is not recorded. Additionally, according to an exemplary embodiment, when it is determined that the voice data includes payment information, other devices (e.g., an agent's device, etc.) may be notified. Conversely, when it is determined that the voice data does not include payment information, the voice data may be recorded. In this way, payment information may be filtered from an audio recording of a call.

FIG. 1A is a diagram illustrating an exemplary environment 100 in which an exemplary embodiment for real-time screening of payment information may be implemented. As illustrated in FIG. 1A, environment 100 may include user devices 105-1 through 105-N (referred to generally as user device 105 or user devices 105), a network 110, and call centers 115-1 through 115-Z (referred to generally as call center 115 or call centers 115). Call centers 115 may include analytic devices 120-1 through 120-Z (referred to generally as analytic device 120 or analytic devices 120), and recording devices 125-1 through 125-Z (referred to generally as recording device 125 or recording devices 125). Each call center 115 may include agent devices 130-1 through 130-X (referred to generally as agent device 130 or agent devices 130).

The number of devices and networks, and the configuration in environment 100 is exemplary and provided for simplicity. In practice, environment 100 may include additional devices, fewer devices, different devices, and/or differently arranged devices than those illustrated in FIG. 1A. For example, analytic device 120 and recording device 125 may be combined. Additionally, or alternatively, for example, analytic device 120 and/or recording device 125 may reside outside of call center 115 (e.g., off-site, within network 110, etc.) and/or may be implemented in a centralized manner. Also, according to other embodiments, one or more functions and/or processes described as being performed by a particular device may be performed by a different device, or a combination of devices, which may or may not include the particular device. Environment 100 may include wired and/or wireless connections among the devices, networks, etc., illustrated in FIG. 1A.

User device 105 may correspond to a mobile device, a stationary device, a handheld device, a wrist-worn device, a tablet device, or a portable device. For example, user device 105 may include a computational device having communication capabilities (e.g., a desktop computer, a laptop computer, a palmtop computer, etc.) or a communication device (e.g., a wireless phone, a wired phone, an Internet Protocol (IP) phone, etc.).

Network 110 may include one or multiple networks of a variety of types. For example, network 110 may include a wide area network (WAN), a public switched telephone network (PSTN), a Voice-over Internet Protocol (VoIP) network, a cellular network, a Public Land Mobile Network (PLMN), etc. Network 110 may operate according to one or multiple communication standards, protocols, etc.

Call center 115 may correspond to a location, for example, in which customers may communicate with an organization, a business, a Service Provider (SP), etc. Analytic device 120 may correspond to a network device that analyzes data to determine whether payment information is present. For example, analytic device 120 may correspond to a server device, a gateway device, a routing device, a proxy device, or a peer device. According to an exemplary embodiment, analytic device 120 may be configured as an in-line device with respect to recording device 125. According to an exemplary embodiment, and in contrast to other approaches, analytic device 120 may be recording device agnostic and/or network agnostic. As will be described further below, analytic device 120 may output data to recording device 125 or not output data to recording device 125 depending on whether the data includes payment information.

According to an exemplary embodiment, analytic device 120 may analyze voice data. For example, analytic device 120 may include natural language processing that is capable of identifying payment information and/or word(s) preceding the divulgence of payment information (e.g., pre-divulging words). According to an exemplary embodiment, the natural language processing may identify the presence of payment information and/or pre-divulging words based on an analytic rule set. Analytic device 120 will be described further below.

Recording device 125 may correspond to a network device that records and stores data. For example, recording device 125 may record voice data and store the voice data.

Agent device 130 may include a device that allows an agent to communicate with customers, allows access to information associated with customers, allows information acquired from customers to be input (e.g., via an agent, via an automated system, etc.), etc. For example, agent device 130 may include a computational device having communication capabilities (e.g., a desktop computer, etc.) or a communication device (e.g., a wireless phone, a wired phone, an IP phone, etc.).

FIGS. 1B-1F are diagrams illustrating an exemplary process for providing real-time screening of payment information according to an exemplary embodiment. While particular messages or information may be illustrated as being sent by or received by a particular device in environment 100, according to other embodiments, the exemplary messages may be sent by or received by a different device or a combination of devices.

Referring to FIG. 1B, according to an exemplary process, it may be assumed that a user (not illustrated) places a voice call to call center 115-1 via user device 105-1 and network 110. The voice call may be received by agent device 130-1. According to one example, the user may speak with an agent (not illustrated). According to another example, the user may speak to an automated system included in agent device 130-1.

As illustrated in FIG. 1C, according to the exemplary process, during the course of the voice call, analytic device 120-1 may analyze the voice call. By way of example, analytic device 120-1 may use natural language processing to identify the utterance of payment information as well as pre-divulging words based on an analytic rule set. According to an exemplary embodiment, analytic device 120-1 may determine whether the voice call should be forwarded to recording device 125-1 based on the analysis. For example, analytic device 120-1 may determine whether the voice call should be forwarded to recording device 125-1 depending on a measure of certainty ascertained from the analysis. For example, analytic device 120-1 may continuously compare a value(s) resulting from the analysis to a threshold value, which may represent a level of certainty the voice call includes payment information, pre-divulging word(s), etc.

Figure 1D:
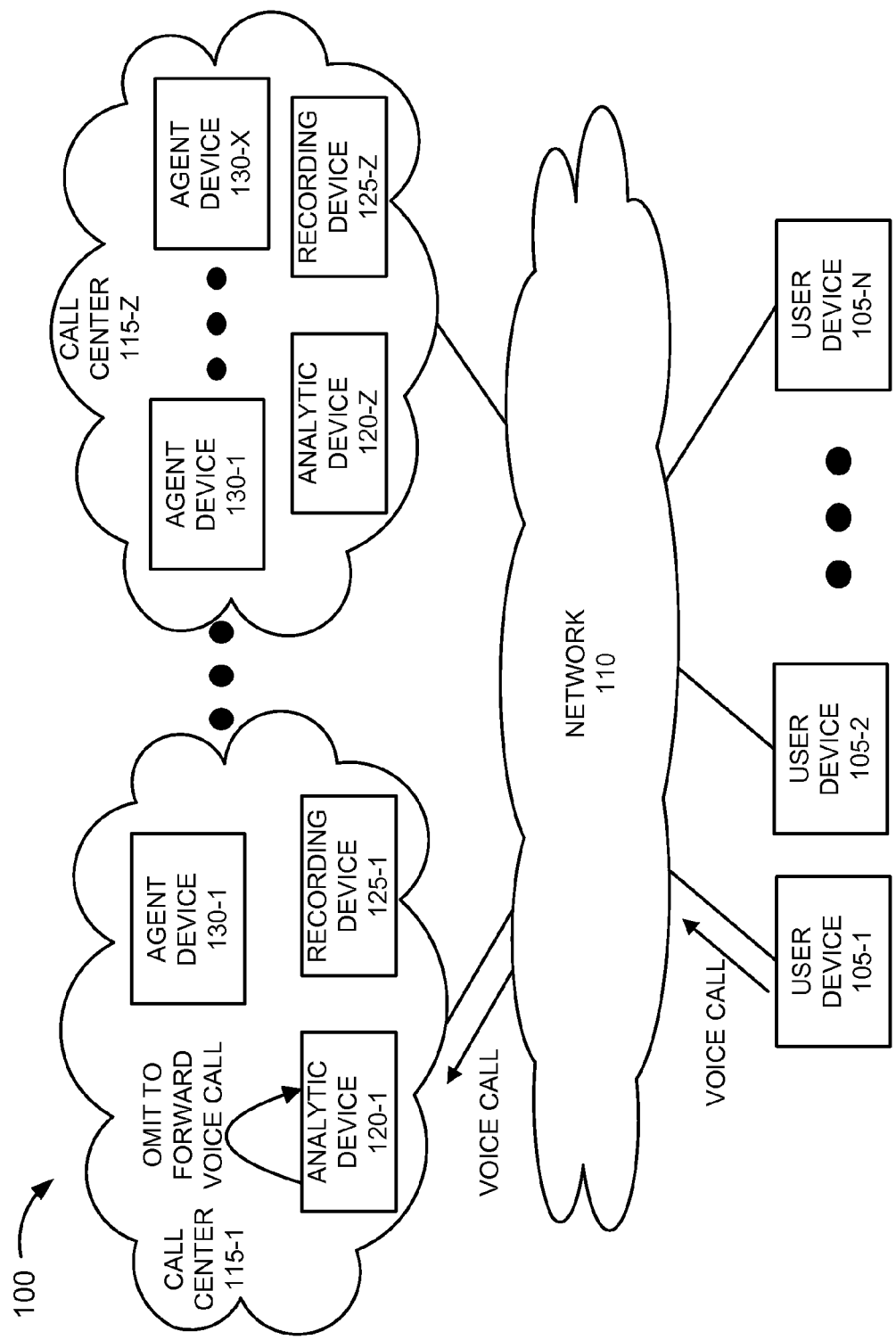
Figure 1E:
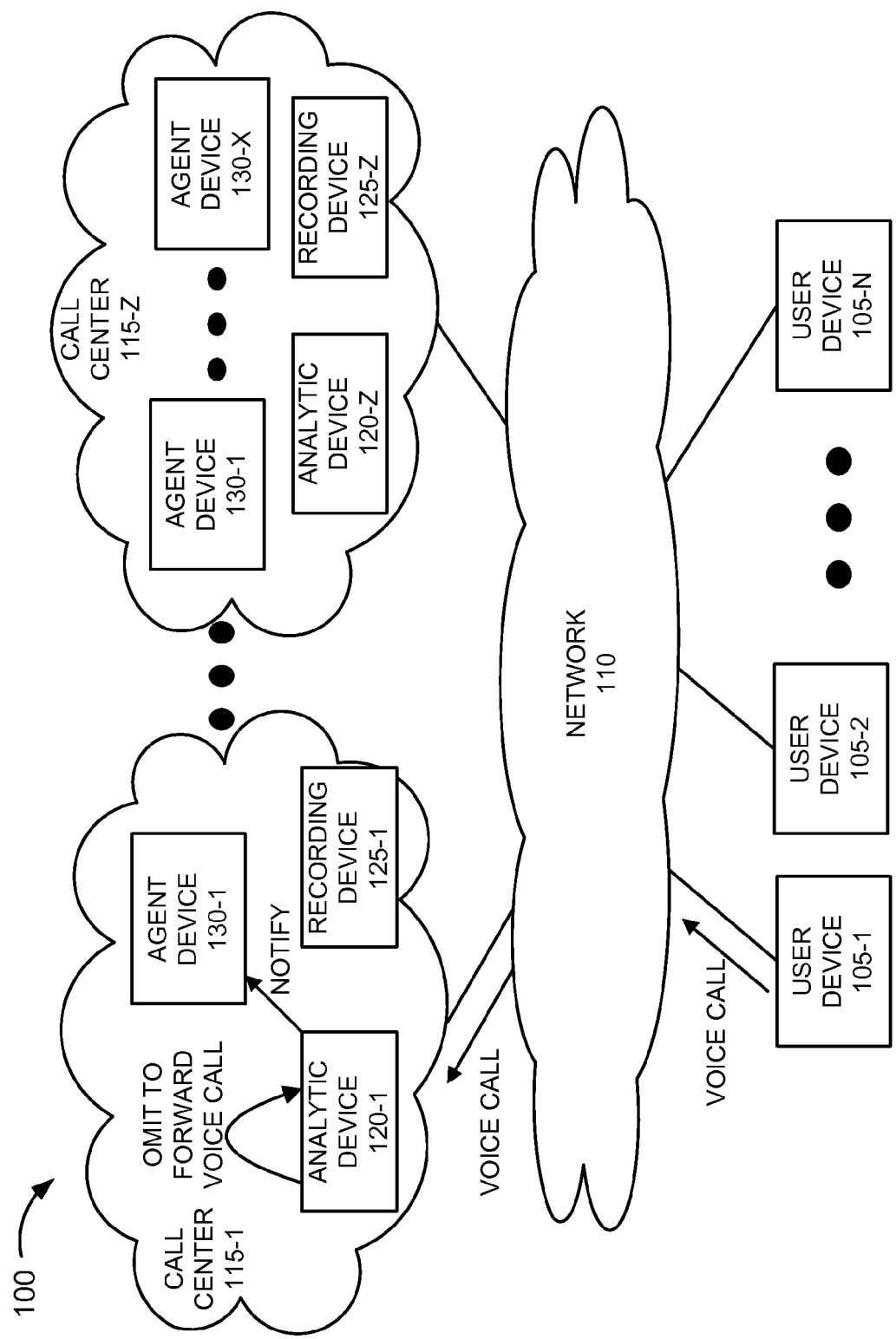

Referring to FIG. 1D, when analytic device 120-1 determines that the voice call includes payment information, pre-divulging word(s), etc., analytic device 120-1 may not forward the voice call to recording device 125-1. For example, analytic device 120-1 may dump the voice call data.

According to an exemplary embodiment, analytic device 120-1 may not forward the voice call to recording device 125-1 for a pre-defined duration of time. According to another exemplary embodiment, analytic device 120-1 may not forward the voice call to recording device 125-1 based on its continual analysis of the voice call. For example, analytic device 120-1 may use natural language processing to continuously identify the presence of payment information or pre-divulging word(s). In this way, analytic device 120-1 may continue to compare the value(s) with the threshold value.

Additionally, or alternatively, according to an exemplary embodiment, analytic device 120-1 may use natural language processing to identify non-payment information or non-pre-divulging word(s). Depending on the outcome of the continuing analysis, analytic device 120-1 may continue to omit the forwarding of the voice call to recording device 125-1 or not. As further illustrated in FIG. 1E, according to an exemplary embodiment, analytic device 125-1 may notify other devices (e.g., agent device 130-1, other devices associated with call center 115-1, etc.) when analytic device 120-1 determines to omit the forwarding of the voice call to recording device 125-1.

Figure 1F:
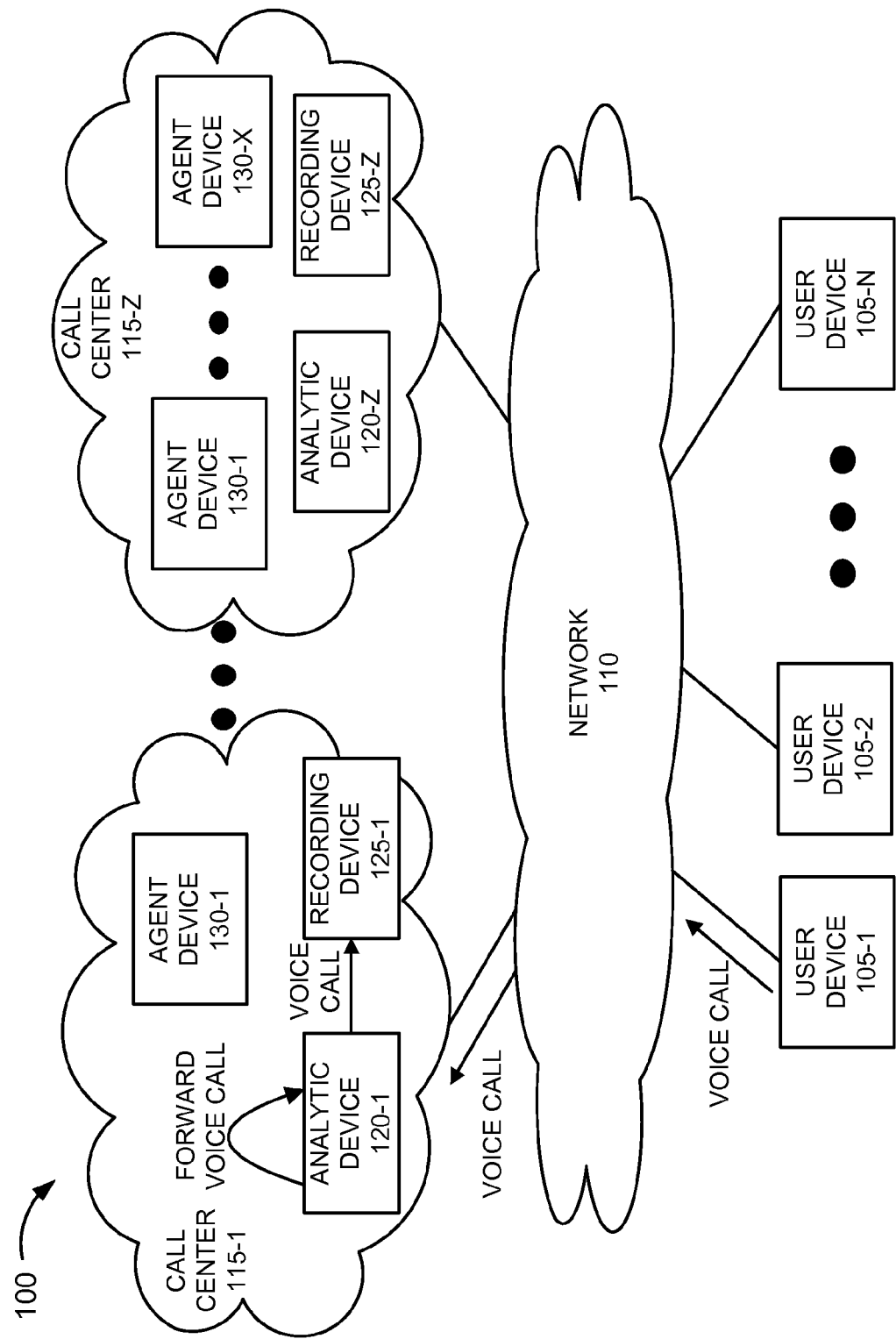

Referring to FIGS. 1C and 1F, when analytic device 120-1 analyzes the voice call and determines that the voice call does not include payment information, pre-divulging word(s), or, in the alternative, determines that the voice call includes non-payment information, non-pre-divulging word(s), etc., analytic device 120-1 may forward the voice call to recording device 125-1. For example, analytic device 120-1 may use natural language processing to identify non-payment information or non-pre-divulging word(s). For example, analytic device 120-1 may continuously compare a value(s) resulting from the analysis to the threshold value, which allows analytic device 120-1 to determine whether the voice call includes payment information, etc., or not. In this case, when the value(s) do not meet the threshold value, analytic device 120-1 may determine that the voice call does not include payment information, pre-divulging word(s), etc.

Figure 2:
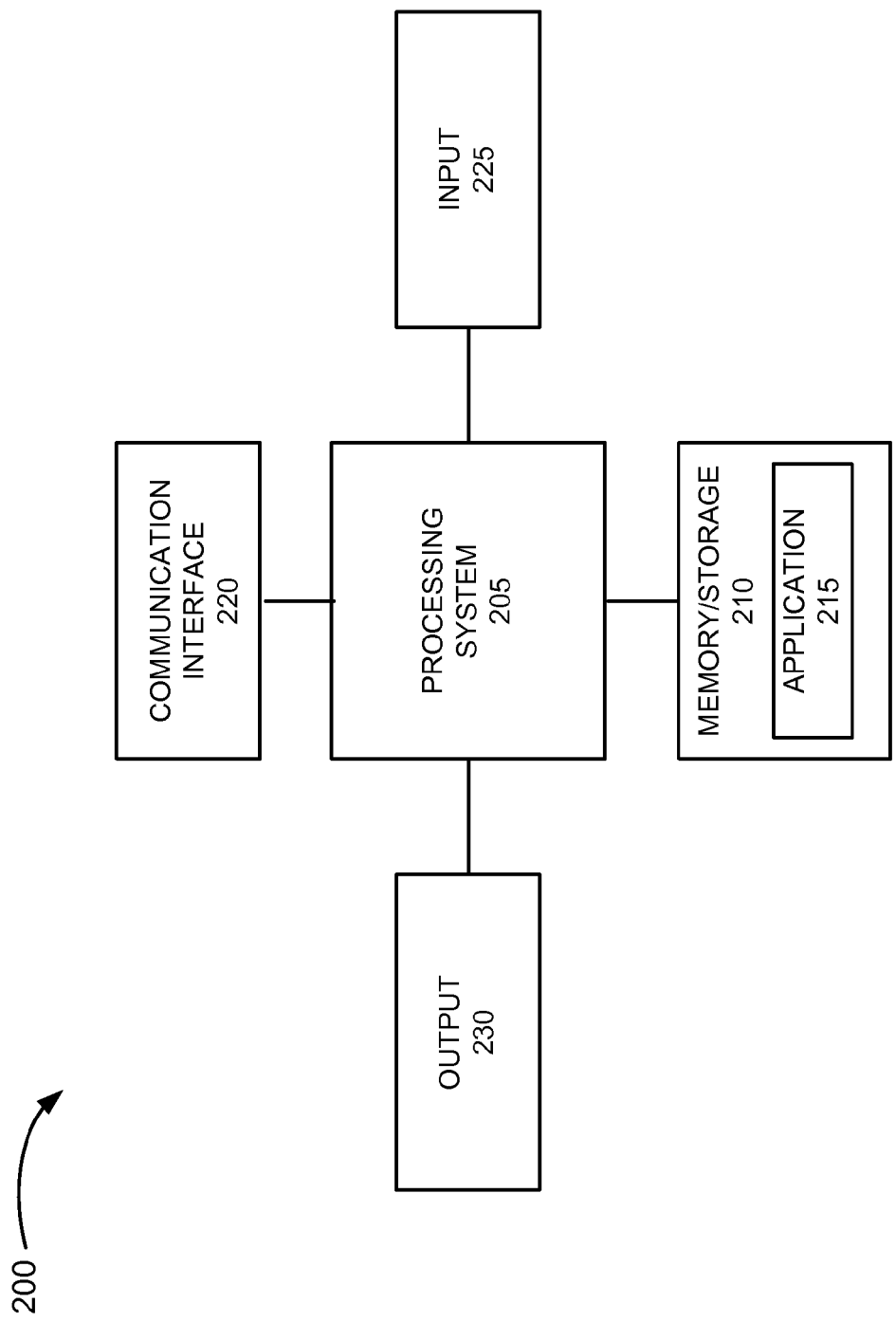
FIG. 2 is a diagram illustrating exemplary components of a device that may correspond to one or more of the devices in the environment depicted in FIGS. 1A-1F.

FIG. 2 is a diagram illustrating exemplary components of a device 200 that may correspond to one or more of the devices in environment 100. For example, device 200 may correspond to user device 105, analytic device 120, recording device 125, etc. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of storage devices. For example, memory/storage 210 may include a random access memory (RAM), a dynamic random access memory (DRAM), a read only memory (ROM), a programmable read only memory (PROM), a flash memory, a phase-change memory (PCM), and/or some other type of storing medium (a computer-readable medium, a compact disk (CD), a digital versatile disk (DVD), etc.). Memory/storage 210 may include a hard disk (e.g., a magnetic disk, an optical disk, a magneto-optic disk, a solid state disk, etc.) or some other type of storing medium, along with a corresponding drive. Memory/storage 210 may be external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to include, for example, a memory, a secondary storage medium, a CD, a DVD, or another type of tangible storing medium. Memory/storage 210 may store data, application(s), and/or instructions related to the operation of device 200.

Applications 215 may include software that provides various services and/or functions. For example, with reference to analytic device 120 and according to an exemplary embodiment, application 215 may include one or multiple applications for performing natural language processing, identifying payment information, pre-divulging word(s), etc. Additionally, or alternatively, applications 215 may include one or more applications associated with other devices to perform one or more processes described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, communication standards, etc.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

As described herein, device 200 may perform processes in response to processing system 205 executing software instructions (e.g., application 215) stored by memory/storage 210. By way of example, the software instructions may be read into memory/storage 210 from another memory/storage 210 or from another device via communication interface 220. The software instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

As previously described, according to exemplary embodiments, real-time screening of payment information may be provided. For example, according to an exemplary embodiment, analytic device 120 may analyze a voice call to determine whether the voice call includes payment information or pre-divulging word(s). Analytic device 120 may allow a voice call to be recorded when the voice call does not include payment information and not allow the voice call to be recorded when the voice call includes payment information. Described below is a further description of exemplary processes associated with real-time screening of payment information.

Figure 3A:
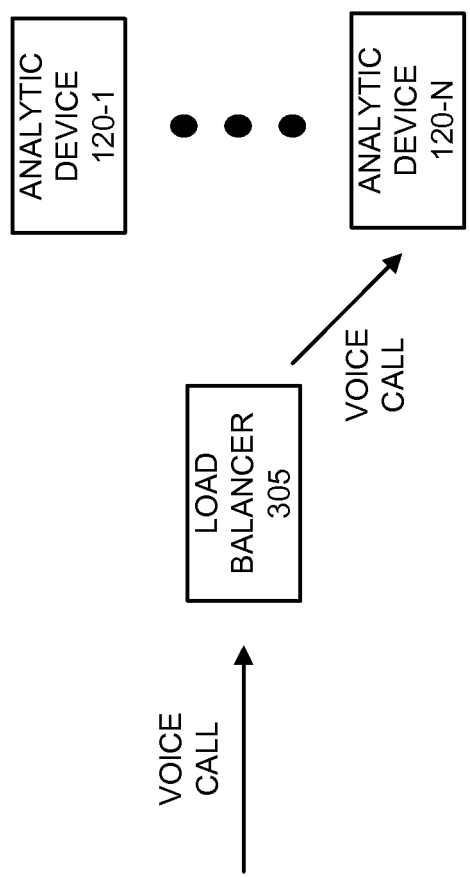
FIGS. 3A-3D are diagrams illustrating exemplary processes for providing real-time screening of payment information in an exemplary environment.

Referring to FIG. 3A, according to an exemplary embodiment, a voice call may be received by a load balancer 305. Load balancer 305 may balance a load associated with voice calls received by one or multiple call centers 115 by appropriately distributing voice calls to analytic devices 120. For example, load balancer 305 may select an analytic device 120 (e.g., analytic device 120-N) to handle the real-time screening of payment information associated with the voice call. According to an exemplary embodiment, the voice call may correspond to a VoIP call. For example, the Real-Time Transport Protocol (RTP) may be used. According to another exemplary embodiment, the voice call may correspond to a non-VoIP call and/or other appropriate protocols may be used.

Figure 3B:
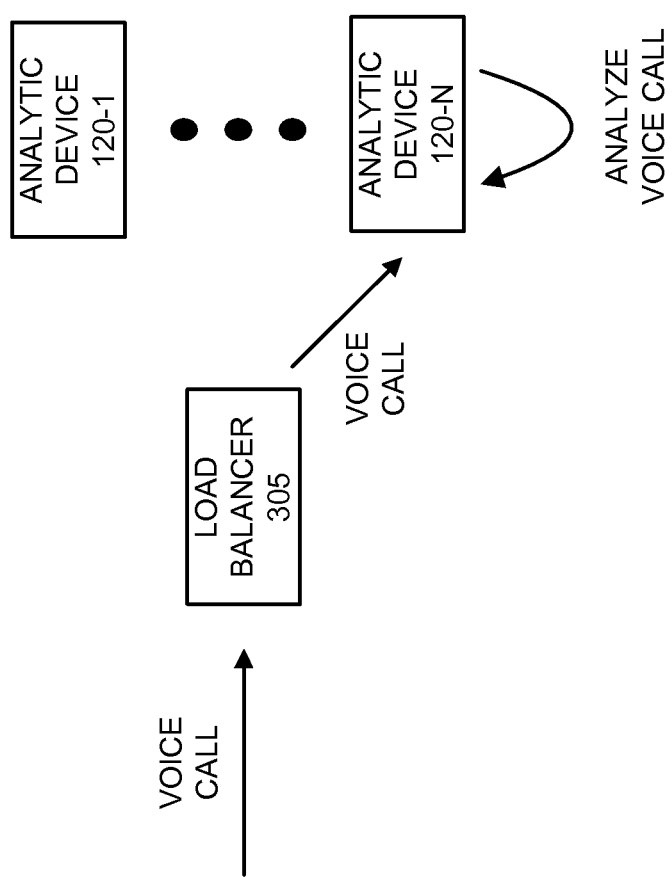

As illustrated in FIG. 3B, analytic device 120 may analyze the voice call to determine whether the voice call includes payment information, pre-divulging word(s), and/or non-payment information, non-pre-divulging word(s). As previously described, according to an exemplary embodiment, analytic device 120 may use natural language processing. According to an exemplary embodiment, the natural language processing may include the process of converting voice data to text data. The natural language processing may use analytic rules to analyze the text data to determine whether the text data includes payment information, pre-divulging word(s), etc. According to another exemplary embodiment, the natural language processing may not include process of converting voice data to text data. For example, the natural language processing may include the process of phonetic analysis in view of analytic rules. According to yet other exemplary embodiments, other processes not specifically described herein may be performed in relation to the natural language processing to identify payment information, etc., and to determine whether a voice call is to be recorded or not.

According to an exemplary embodiment, the analytic rules may include words, phrases, etc., or other representations thereof, associated with payment information, pre-divulging words, phrases, etc. By way of example, "Visa," "Mastercard," "Discover," "credit card," Issuer Identification Numbers (IIN) associated with credit card schemes such as "51" through "56" for Mastercard, "6011" through "65" for Discover, etc., may permit analytic device 120 to identify payment information, etc., in the voice call. By way of example, pre-divulging words may include words that precede payment information, such as "form of payment," "credit card number," etc.

According to an exemplary embodiment, analytic device 120 may determine whether the voice call includes payment information, etc., or not, based on a measure certainty. For example, analytic device 120 may generate values for words spoken during the voice call. These values may depend on various factors related to natural language processing, such as, for example, disambiguation, grammar induction, sentence understanding, syntactic and semantic processing, etc. Additionally, or alternatively, one or more words may have pre-assigned values. Analytic device 120 may use a weighting scheme to generate one or multiple values for comparison to a threshold value.

According to an exemplary embodiment, natural language processing may include artificial intelligence, sentence understanding, etc., to determine whether the voice call includes payment information, etc., whether the voice call is to be recorded, etc. In this way, analytic device 120 may minimize incorrect determinations when, for example, a question includes words corresponding to pre-divulging words, but the answer to the question may not include payment information, may pertain to a previous question, etc. Analytic device 120 may recognize when the voice call includes a human caller and a human agent versus a human caller and an automated system.

According to an exemplary embodiment, depending on whether the customer is conversing with an agent (i.e., a human being) or an automated system (e.g., a virtual agent), the value(s) generated during the analysis (e.g., value associated with word(s)), the weighting system, the value(s) pre-assigned, and/or the threshold value may be different. For example, the automated system may provide a greater predictability relative to an agent (i.e., a human agent) with respect to content of questions, content of answers, identifying pre-divulging words, identifying payment information, etc.

Figure 3C:
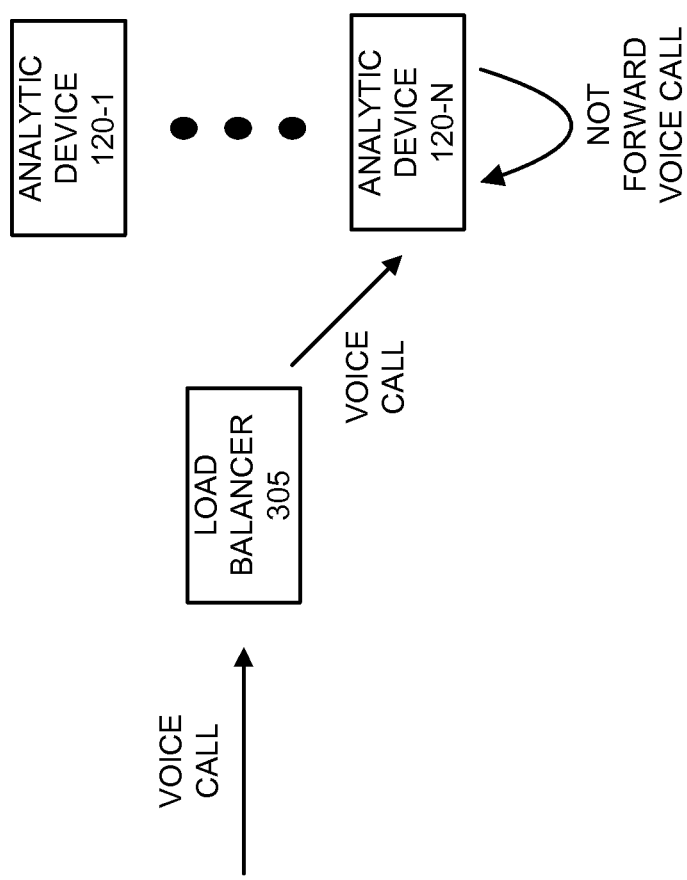
Figure 3D:
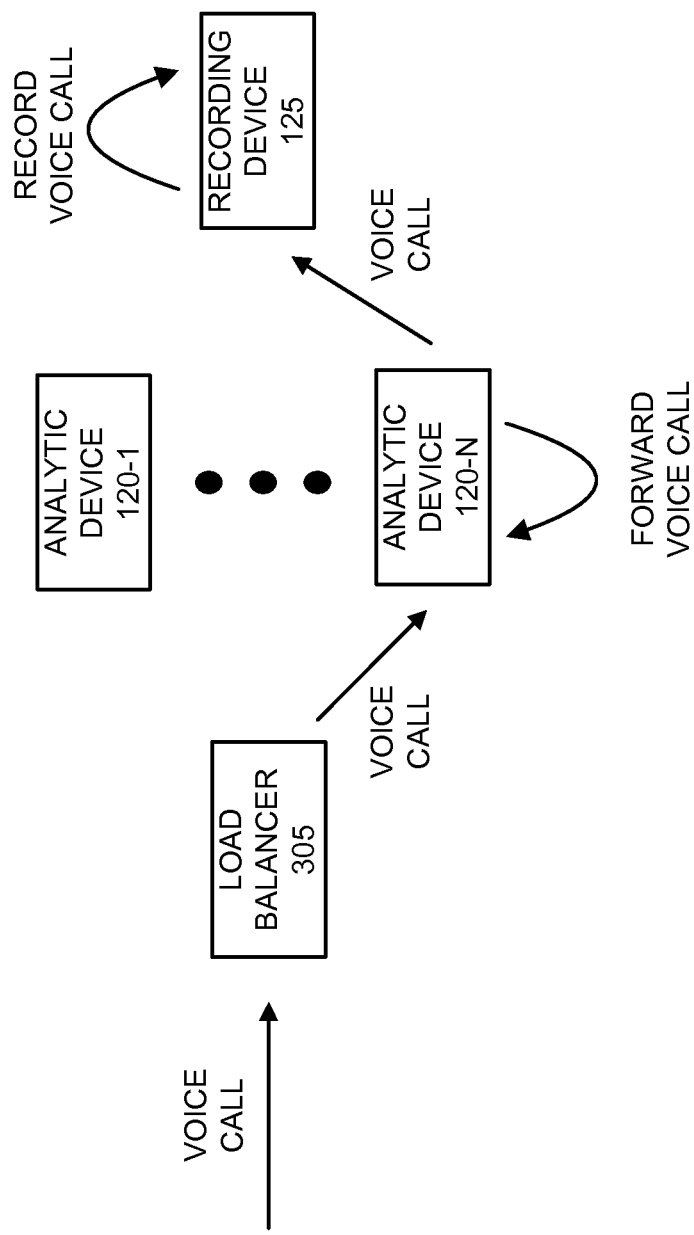

Referring to FIG. 3C, when analytic device 120 determines that the voice call includes payment information, analytic device 120 may omit to forward the voice call to recording device 125 (not illustrated). For example, analytic device 120 may dump (e.g., delete) the voice data. Alternatively, as illustrated in FIG. 3D, when analytic device 120 determines that the voice call does not include payment information, analytic device 120 may forward the voice call to recording device 125. Recording device 125 may record the voice call.

Figure 4:
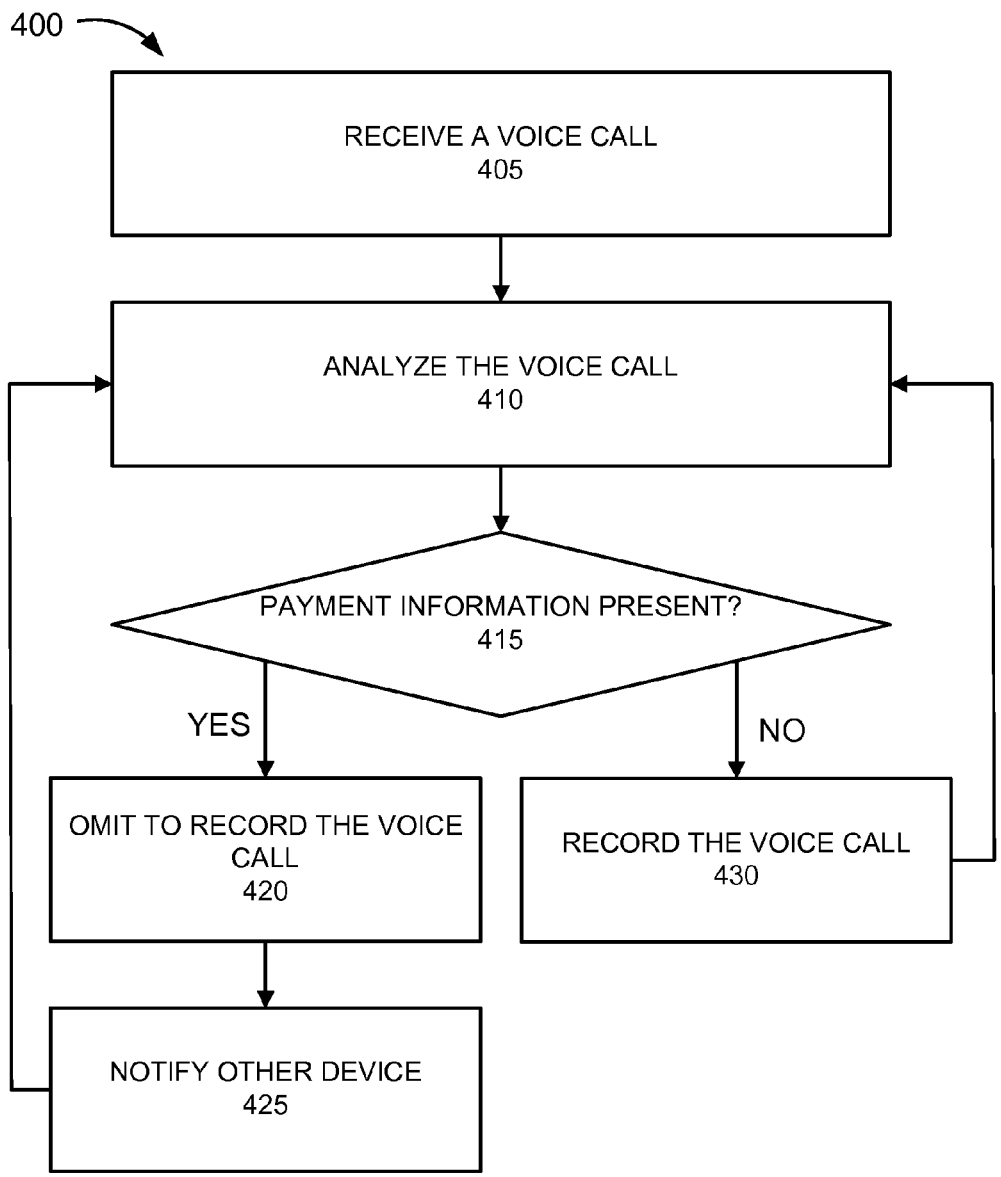
FIG. 4 is a flow diagram illustrating an exemplary process for providing real-time screening of payment information.

FIG. 4 is a flow diagram illustrating an exemplary process 400 for providing real-time screening of payment information. According to an exemplary embodiment, process 400 may be performed by analytic device 120.

A voice call may be received (block 405). For example, as previously described, a customer may place a voice call to a call center. The voice call may be received by, among other devices, analytic device 120.

The voice call may be analyzed (block 410). For example, as previously described, analytic device 120 may perform real-time analysis of the voice call. According to an exemplary embodiment, analytic device 120 may use natural language processing to determine whether the voice call includes payment information, pre-divulging word(s), etc.

It may be determined whether the voice call includes payment information (block 415). For example, as previously described, according to an exemplary embodiment, analytic device 120 may determine a level of certainty with respect to the presence of payment information based on a threshold value. If it is determined that the voice call includes payment information (block 415—YES), the voice call may not be recorded (block 420). For example, as previously described, analytic device 120 may not forward the voice call to recording device 125. Additionally, a notification may be sent to other devices (block 425). For example, as previously described, according to an exemplary embodiment, analytic device 120 may notify other devices (e.g., agent device 130, other devices associated with call center 115, etc.) that the voice call is not being recorded, that the voice call includes payment information, etc.

If it is determined that the voice call does not include payment information (block 415—NO), the voice call may be recorded (block 430). For example, as previously described, analytic device 120 may forward the voice call to recording device 125. Recording device 125 may record the voice call.

Although FIG. 4 illustrates an exemplary process 400 for providing real-time screening of payment information, according to other embodiments, process 400 may include additional operations, fewer operations, and/or different operations than those illustrated in FIG. 4 and described.

The foregoing description of embodiments provides illustration, but is not intended to be exhaustive or to limit the embodiments to the precise form disclosed. Accordingly, modifications to the embodiments described herein may be possible. By way of example, in addition to natural language processing, the analytic device may perform other types of filtering related to dual-tone multi-frequency (DTMF), text messaging, and/or other types of communication to which a customer may communicate payment information, etc., to a center.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified in other implementations. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processing system 205, etc.), a combination of hardware and software (e.g., application 215), a combination of hardware and firmware, a combination of hardware, firmware, and software, or software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction described in the present application should be construed as critical or essential to the implementations described herein unless explicitly described as such.

What is claimed is:

1. A method comprising:
   receiving a voice call which comprises voice data;
   analyzing the voice data during the course of the received voice call;
   identifying, based upon the analyzed voice data, an utterance of payment information in the received voice call;
   omitting to record the voice call in response to identifying that the voice call includes the payment information; and
   recording the voice call in response to identifying that the voice call does not include the payment information.

2. The method of claim 1, wherein the analyzing comprises:
   performing natural language processing to determine whether the payment information is included in the voice call.

3. The method of claim 1, wherein the analyzing comprises:
   analyzing the voice data to determine whether the voice data includes pre-divulging payment information.

4. The method of claim 1, wherein the payment information relates to credit card information associated with a caller.

5. The method of claim 1, further comprising:
   storing payment information words and pre-divulging payment information words; and
   generating values when analyzing the voice data based on the payment information words and the pre-divulging payment information words.

6. The method of claim 5, further comprising:
comparing one or more values resulting from the analyzing to a threshold value that indicates a level of certainty that the voice call includes the payment information.

7. The method of claim 1, further comprising:
notifying a call center device that the voice call is not being recorded in response to identifying that the voice call includes the payment information.

8. The method of claim 1, wherein the voice call corresponds to a Voice-over Internet Protocol (VoIP) phone call.

9. A device comprising logic configured to:
receive a voice call from a caller, wherein the voice call comprises voice data;
analyze the voice data during the course of the received voice call;
identify, based on the analyzed voice data, an utterance of payment information in the received voice call;
omit to forward the voice call to a recording device in response to identifying that the voice call includes the payment information; and
forward the voice call to a recording device in response to identifying that the voice call does not include the payment information.

10. The device of claim 9, wherein the device includes one or more of a server device, a gateway device, a routing device, or a proxy device.

11. The device of claim 9, wherein the logic is further configured to:
compare one or more values resulting from the analyzing to a threshold value that indicates a level of certainty that the voice call includes the payment information.

12. The device of claim 9, wherein the logic is further configured to:
recognize whether the caller is speaking with an automated system or a human being.

13. The device of claim 9, wherein the logic is further configured to:
analyze the voice data to determine whether the voice data includes pre-divulging payment information words.

14. The device of claim 9, wherein the logic is further configured to:
generate values for words included in the voice data; and
compare the values to a threshold value that indicates a level of certainty that the voice data includes payment information.

15. The device of claim 9, wherein the logic is further configured to:
omit to forward the voice call to the recording device for a predetermined time period.

16. The device of claim 9, wherein the logic is further configured to:
omit to forward the voice call to the recording device until it is determined that the voice call does not include payment information.

17. A computer-readable medium containing instructions executable by at least one processor, the computer-readable medium storing instructions for:
receiving a voice call from a caller, wherein the voice call comprises voice data;
analyzing the voice data during the course of the received voice call;
identifying, based upon the analyzed voice data, an utterance of payment information in the received voice call;
omitting to forward the voice call to a recording device in response to identifying that the voice call includes the payment information; and
forwarding the voice call to a recording device in response to identifying that the voice call does not include the payment information.

18. The computer-readable medium of claim 17, further comprising one or more instructions for:
comparing values generated when analyzing to a threshold value that indicates a level of certainty that the voice includes payment information.

19. The computer-readable medium of claim 17, further comprising one or more instructions for:
converting the voice data to text; and
comparing the text to an analytic rule set that includes words designated as payment information.

20. The computer-readable medium of claim 17, further comprising one or more instructions for:
performing natural language processing of the voice data.

* * * * *